United States Patent
Timperi et al.

(10) Patent No.: US 8,160,663 B2
(45) Date of Patent: Apr. 17, 2012

(54) METHOD AND APPARATUS CONCERNING SLIDING PARTS

(75) Inventors: Mikko Timperi, Turku (FI); Tommi Teuri, Teijo (FI)

(73) Assignee: Nokia Corporation, Espoo (FI)

( * ) Notice: Subject to any disclaimer, the term of this patent is extended or adjusted under 35 U.S.C. 154(b) by 413 days.

(21) Appl. No.: 12/455,242

(22) Filed: May 28, 2009

(65) Prior Publication Data
US 2010/0301722 A1    Dec. 2, 2010

(51) Int. Cl.
*H04M 1/00* (2006.01)
(52) U.S. Cl. ............... 455/575.4; 455/575.9; 455/575.8
(58) Field of Classification Search ..... 455/575.1–575.9
See application file for complete search history.

(56) References Cited

U.S. PATENT DOCUMENTS

| | | | |
|---|---|---|---|
| 6,105,411 A * | 8/2000 | Moriya | 72/75 |
| 6,203,233 B1 * | 3/2001 | Stanley | 403/28 |
| 6,947,778 B2 * | 9/2005 | Tsai | 455/575.4 |
| 7,363,068 B2 * | 4/2008 | Ku | 455/575.4 |
| 7,363,640 B2 * | 4/2008 | Wang et al. | 720/657 |
| 7,373,679 B2 * | 5/2008 | Miller | 5/662 |
| 7,744,174 B2 * | 6/2010 | Peng et al. | 312/333 |
| 7,744,175 B2 * | 6/2010 | Peng et al. | 312/333 |
| 2004/0198246 A1 | 10/2004 | Tsai | 455/90.1 |
| 2005/0277451 A1 * | 12/2005 | Ku | 455/575.4 |
| 2009/0085387 A1 * | 4/2009 | Thiel et al. | 297/284.11 |

FOREIGN PATENT DOCUMENTS

| EP | 2 034 700 A1 | 3/2009 |
|---|---|---|
| WO | WO 2006/006776 A1 | 1/2006 |

* cited by examiner

*Primary Examiner* — Lam T Mai
(74) *Attorney, Agent, or Firm* — Harrington & Smith

(57) ABSTRACT

An apparatus including a first rail part and a second rail part which are allowed to slide with respect to each other. The apparatus further includes a wearable protrusion in one of the rail parts to set a pre-defined clearance between the rail parts. A method is also disclosed.

15 Claims, 3 Drawing Sheets

METHOD AND APPARATUS CONCERNING SLIDING PARTS

TECHNICAL FIELD

The present invention generally relates to the user interface of mobile devices. The invention relates particularly, though not exclusively, to sliding parts of mobile devices.

BACKGROUND ART

Presently, many mobile devices are equipped with sliding parts, such as sliding covers, that make it possible to expand the user interface surface of the device while still keeping the device compact in a closed configuration. The sliding part of typically moves along rails installed in the sliding part and in a base part. Manufacturing such devices requires a high level of control over clearances between the rail parts. Ideally, the sliding part should be able to move freely without unnecessary friction between the rail parts, but at the same time any extra wobbliness between the parts is undesirable.

SUMMARY

According to a first example aspect of the invention there is provided an apparatus comprising:
a first rail part and a second rail part slidingly movable with respect to each other; and
a wearable protrusion in one of the rail parts to set a pre-defined clearance between the rail parts.

Currently the manufacturing process of slide mechanisms relies on stringent control of tolerances of individual parts and the assembly process, and requires multiple quality control steps. The embodiments of the invention may be used when trying to achieve a simplified manufacturing and assembly method at least to some respects that would decrease cost and improve yield of production. The embodiments of the invention may be used to help in achieving direct control of the clearance between parts.

The protrusion may have been intentionally created and may be to wear off intentionally to cause the desired clearance. In other words, the protrusion may be intentionally wearable.

In certain embodiments, the protrusion is configured to intentionally wear off rapidly when the apparatus is taken into use. The protrusion may wear off rapidly or immediately upon taking into use. This may mean that the protrusion will completely wear of when a sliding mechanism defined by the rail parts is being moved a few times between extreme positions. In other embodiments, the protrusion is configured to intentionally wear off less rapidly.

In certain embodiments, upon taking the apparatus into use, the protrusion (or protrusions) is reduced to a small fraction of its original height when device parts are moved back and forth a few times. On the long run (hundreds of moves) the protrusion may disappear completely or almost completely.

In certain embodiments, the apparatus is configured to have the pre-defined and desired clearance upon the protrusion wearing off. In certain embodiments, the apparatus is configured to have the pre-defined and desired clearance upon the protrusion completely wearing off In certain embodiments, the height of the created protrusion may be about 0.02 mm. In certain other embodiments, the height of the protrusion is larger than that. In certain embodiments the maximum height of the protrusion is about 0.05 mm.

In certain embodiments, the protrusion is configured to set a clearance in a side direction (z-direction) of the apparatus perpendicular to a sliding direction. In certain embodiments, the protrusion is configured to set a clearance between rail parts on a first sliding part (such as a sliding cover) of the apparatus and an apparatus base part or base plate sides.

In certain embodiments, the protrusion is a burr formed in an over-molding process.

In certain embodiments, the number of protrusions or burrs per rail is 4 to 6. In other embodiments, the number of protrusions or burrs per rail is larger. In other embodiments, the number of protrusions or burrs per rail is smaller, such as 3.

In certain embodiments, the first rail part is an over-molding over a first part of the apparatus. In certain embodiments, the first rail part is of moldable material, such as plastic. In certain embodiments, instead of being an over-molding, the first rail part may alternatively be molded separately, and installed into the apparatus (for example, into a base plate). The first rail part, if molded separately, may be installed, for example, by snap fitting.

In certain embodiments, the second rail part is a separate rail attached to a second part of the apparatus. In certain embodiments, the second rail part is of material harder than the material of the first rail part, such as metal.

In certain embodiments, the rail parts are C-shaped or I-shaped rails. In certain embodiment, the rail parts are rails overlapping so that the edge of one rail is placed and is allowed to travel inside a partially closed space defined by the other rail.

In certain embodiments, the apparatus has a burr in a mouth of a first rail, the burr being configured to wear off when an edge of another rail is moved against the burr.

In certain embodiments, the apparatus is a mobile device, such as a mobile terminal or mobile station. The mobile terminal or station is in certain embodiments a mobile terminal or station of a cellular system, such as a mobile phone.

In certain embodiments, a rail on a base plate of an apparatus has an over-molded plastic part that has controlled burrs along the rail. The burrs may be evenly spaced along the length of the rail. When the rail on a sliding part of the apparatus (such as a display holder part) is installed by, e.g., laser-welding, the burrs on the plastic rail serve to define the clearing. When the device is subsequently taken into use, the burrs wear off, and the desired clearance remains between the parts.

In certain embodiments, instead of attaching to the first part of the apparatus, the first rail part of moldable material may be attached, to the second part of the apparatus (display holder part or similar). Similarly, in this embodiment, instead of attaching to the second part of the apparatus, the second rail part may be attached to the first part of the apparatus.

In yet another embodiments, an alternative of the separate rail part(s) is provided. In these embodiments, the apparatus comprises plate-shaped rail sections protruding from cutouts arranged into the second part of the apparatus. The plate-shaped rail sections may be slidingly movable within the first rail part.

According to a second example aspect of the invention there is provided a method comprising:
providing an apparatus with a first rail part and a second rail part which are allowed to slide with respect to each other; and
applying a wearable protrusion in one of the rail parts to set a pre-defined clearance between the rail parts.

Certain embodiments provide using intentionally created burrs of controlled height (pre-defined height) to set the clearance between the rail parts. In certain embodiment, a clearance control between rails parts on a sliding cover of the apparatus and the base part or plate sides is achieved.

In certain embodiments, a first part of the apparatus is used as a mould over which moldable material is over-molded to form the first rail part.

In certain embodiments, the protrusion is created into the first rail part as a burr by over-molding.

In certain embodiments, the method comprises:
pressing the second rail part against the protrusion arranged into the first rail part when attaching the second rail part to a second part of the apparatus.

In certain embodiments, the method comprises:
attaching the second rail part to the second part by welding, such as laser welding.

Different non-binding exemplary aspects and embodiments of the present invention have been illustrated in the foregoing. The above embodiments are used merely to explain selected aspects or steps that may be utilized in implementations of the present invention. Some embodiments may be presented only with reference to certain exemplary aspects of the invention. It should be appreciated that corresponding embodiments may apply to other exemplary aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

The following presents an example apparatus and an example method or assembly process in accordance with certain selected example embodiments of the invention.

Figure 1:
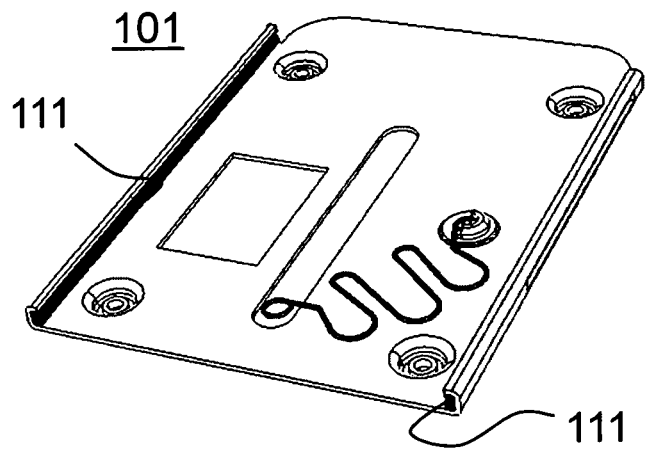
FIG. 1 shows a first part of an apparatus in accordance with certain embodiments.

FIG. 1 shows a first part 101 of an apparatus. In certain embodiments, the first part 101 is a base part, base plate or a body part of the apparatus. In certain embodiments the apparatus is a mobile device, such as a mobile terminal or mobile station. The mobile terminal or station is in certain embodiments a mobile terminal or station of a cellular system, such as a mobile phone.

The first part 101 comprises over-molded rails 111, as an over-molding, on the opposite edge portions of the first part 101. In an over-molding process the first part of the apparatus may be used as a mould over which moldable material is over-molded. A suitable (additional) mould may be used to form a desired rail structure on the surface that appears as a free surface of the over-molding in FIG. 1. In certain embodiments, the over-molding is of plastic.

Figure 2:
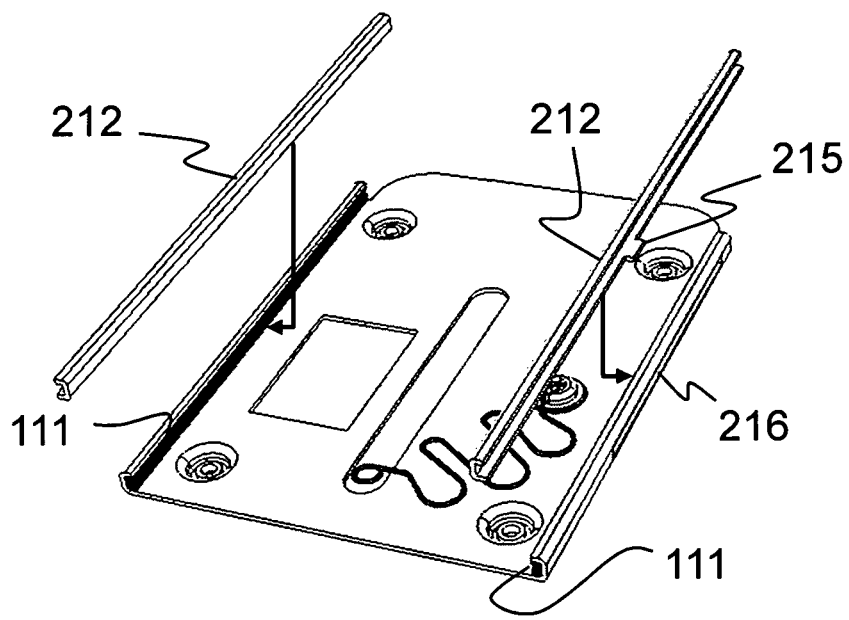
FIG. 2 shows separate rails to be attached in connection with the first part in accordance with certain embodiments.

FIG. 2 shows separate rails 212 that are attached in connection with the over-molded rails 111 to establish a rail system allowing the over-molded rails 111 to slide along the separate rails 212. In certain embodiment, the separate rails 212 are of metal or at least of material harder than the material of the over-molding.

The separate rails 212 may comprise a protrusion or bump 215 that is allowed to slide horizontally within a cut out 216 arranged in the first part 101 to provide a stopper.

Figure 3:
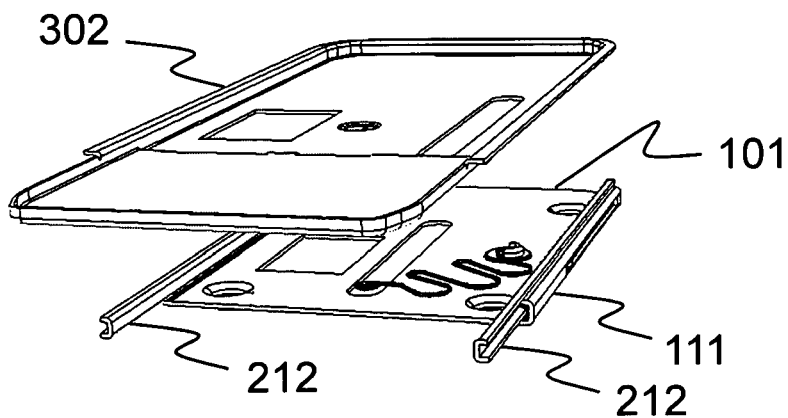
FIG. 3 shows a second part of the apparatus in accordance with certain embodiments.

FIG. 3 shows a second part 302 of the apparatus. In certain embodiments, the second part 302 is a sliding cover, a display holder or another sliding part.

The second part 302 is attached on the first part 101 and rails 212 by a suitable method. In certain embodiments, laser welding can be used. In certain embodiments, the second part 302 is attached to the rails 212 by laser welding. The second part 302 is thus connected with the first part 101 via the rail system and is allowed to slide with respect to the first part 101 of the apparatus.

Figure 4:
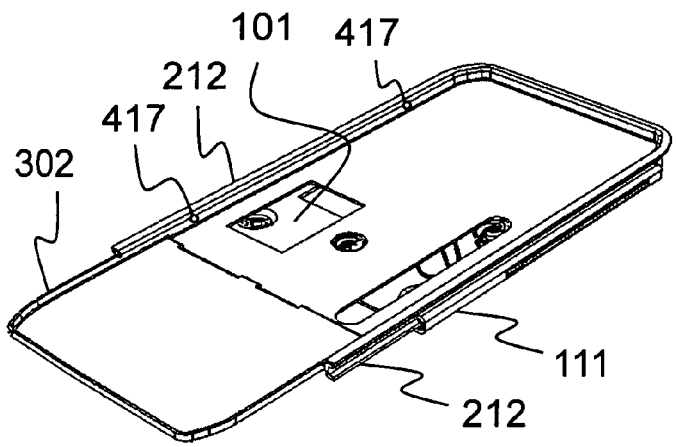
FIG. 4 shows the second part attached to a rail part in accordance with certain embodiments.

FIG. 4 shows the second part 302 attached to the rails 212 in its final position. Visible in FIG. 4 are also adjustment holes 417 in the second part 302 for a jig used in certain embodiments.

Figure 5:
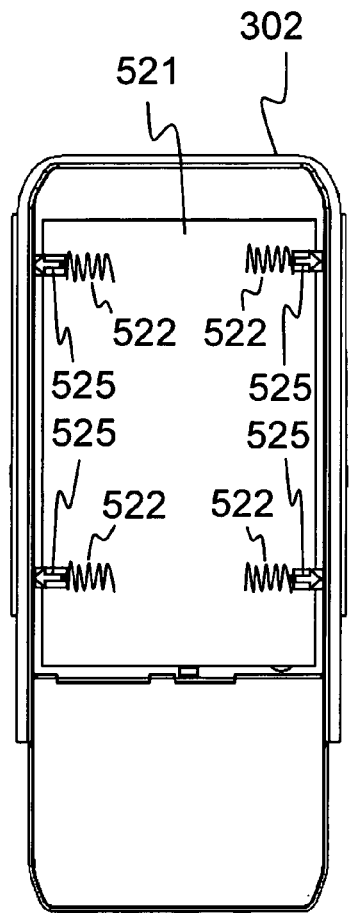
FIG. 5 shows a jig in accordance with certain embodiments.

FIG. 5 shows a jig 521 placed onto the second part 302 in order to facilitate the assembly process. The jig 521 can be used for adjusting the rails and the second part 302 into a right place. The jig 521 according to certain embodiments is with springs 522 that cause a pushing force through the holes 417 against the rails 212 as depicted by the arrows 525. The rails 212 are in that way pushed against the over-molded rails 111.

Figure 6:
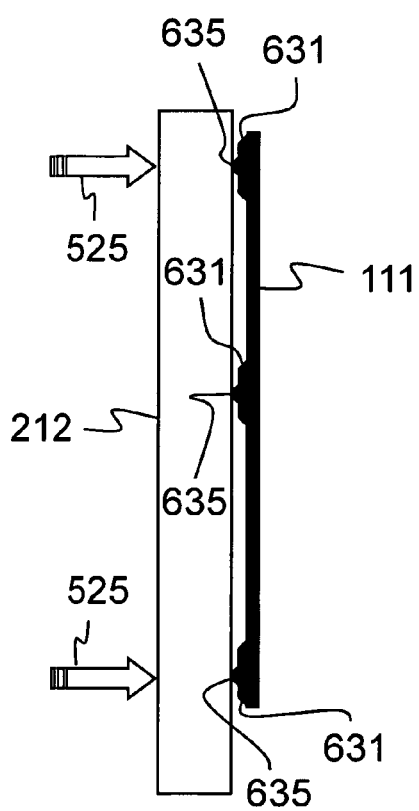
FIG. 6 shows a longitudinal cross-section of rail parts in accordance with certain embodiments.

FIG. 6 shows a longitudinal cross-section of the rail parts 111 and 212. The over-molded rails 111 comprise a set of protrusions or burrs 635 along the rail. The burrs 635 have a pre-defined height, which may have been defined for example by a mould (not shown) used in an over-molding process. Each burr 635 can be on top of another protrusive structure or part 631 that protrudes from a bottom surface of the rail 111. The part 631 is typically meant to remain in the apparatus and is not intended to be wearable. In a practical embodiment, the height of the burrs 635 may be, for example, approximately 0.02 mm. The burrs 635 may be evenly or unevenly spaced along the length of the rail 111.

Figure 7:
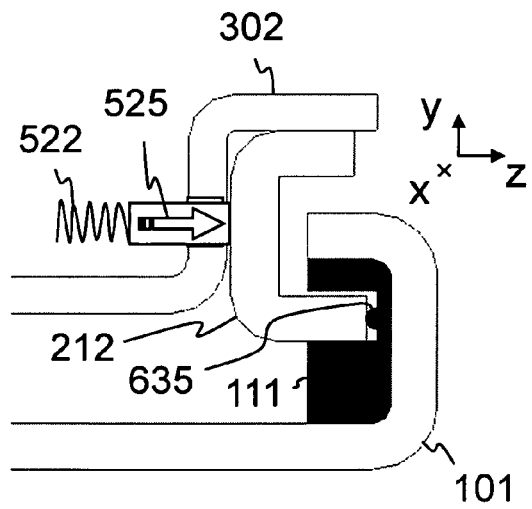
FIG. 7 shows a phase in an example assembly process in accordance with certain embodiments.

In an example assembly process, the rail 212 is pushed against the burr 635 of the rail 111 as depicted in yet more detail in FIG. 7. Simultaneously, the rail 212 is installed on the second part 302, for example by laser welding. As a consequence the burr 635 on the over-molded rail 111 serves to define desired clearance in the side direction (z-direction) of the apparatus. When the apparatus is subsequently taken into use, the burr(s) 635 intentionally wear off rapidly or less rapidly, and the desired pre-defined clearance remains between the rail parts 111 and 212.

The directions have been defined in FIG. 7 as an orthogonal system so that x-direction is the sliding direction (depicted in FIG. 7 as the direction perpendicular to the plane of the paper), y-direction is the vertical direction (defined, for example, as the direction that is basically perpendicular to the top user interface surface of the apparatus) and z-direction is the mentioned side direction of the apparatus perpendicular to the x- and y-directions.

Figure 8:
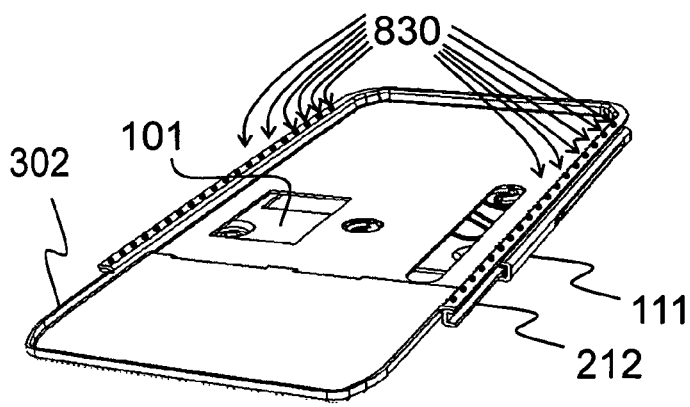
FIG. 8 shows attachment points in accordance with certain embodiments.

FIG. 8 shows the attachment points 830 that may be used to attach the second part 302 to the rail 212, for example, by laser welding or by another suitable attachment method.

Figure 9:
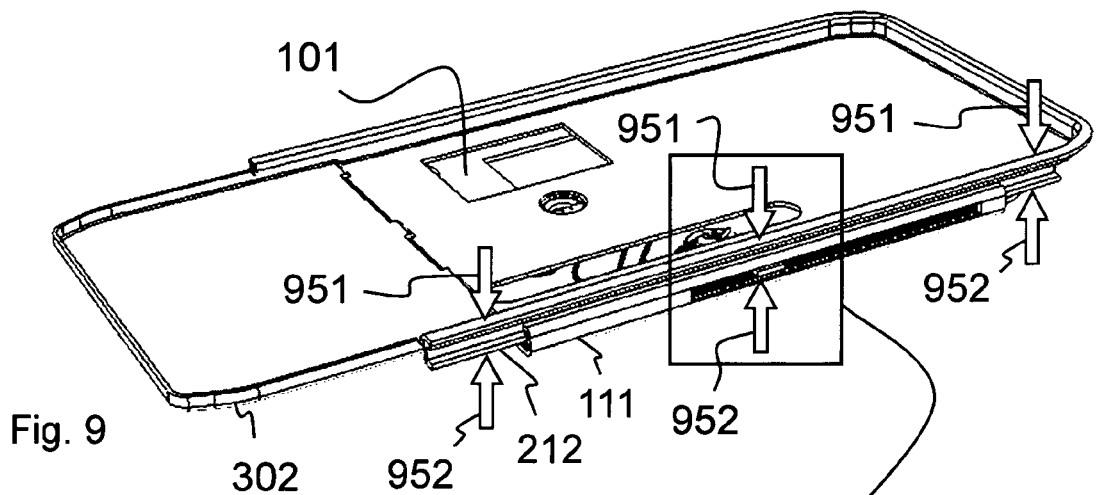
FIG. 9 shows welding supports in accordance with certain embodiments.
Figure 10:
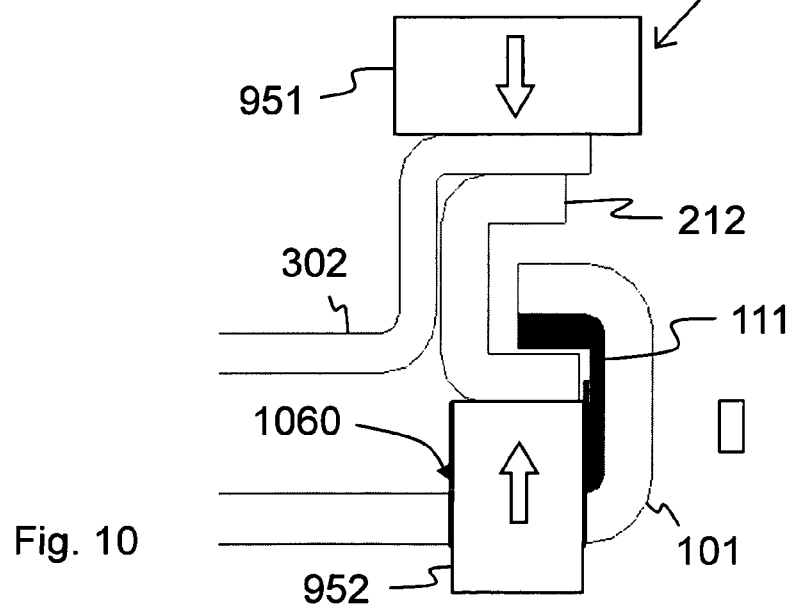
FIG. 10 shows an enlargement of a detail of FIG. 9.

FIG. 9 shows welding supports that may be used in accordance with certain embodiments if welding, for example, laser welding, is used to attach parts together. In certain embodiments upper welding supports 951 and lower welding supports 952 are arranged in the end portions and in the center area of the rail 212. As depicted in the enlargement shown in FIG. 10, an upper welding support 951 is in certain embodiments directly supporting the second part 302 and a lower welding support 952 supporting the bottom of the rail 212 through a cut out 1060 arranged in the first part 101.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

In certain embodiments, for example, the wearable protrusions 935 or similar are arranged into the second rail 212 or similar instead of the first rail 111. Furthermore, in certain embodiments, the over-molded rail is arranged into the second part 302 instead of the first part of the apparatus. In certain embodiments the second rail 212 is not a separate rail but a rail permanently fixed to the second part 302 or similar. In certain embodiments, the rails are not C-shaped rails as presented in the foregoing embodiment. One or both of the rails may be I-rails or may have another suitable cross-section. In certain embodiments, the format or shape of the parts is different from what has been presented in the foregoing example embodiments. In certain other embodiments, completely different parts from those presented in the foregoing embodiments are used.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
    a first rail part and a second rail part slidingly movable with respect to each other; and
    a wearable protrusion in one of the rail parts to set a pre-defined clearance between the rail parts, the protrusion having been intentionally created and is to wear off intentionally to cause the clearance.

2. An apparatus comprising:
    a first rail part and a second rail part slidingly movable with respect to each other; and
    a wearable protrusion in one of the rail parts to set pre-defined clearance between the rail parts, wherein the protrusion is configured to intentionally wear off rapidly when the apparatus is taken into use.

3. The apparatus of claim 1, wherein the protrusion is a burr.

4. The apparatus of claim 1, wherein the protrusion is configured to set the clearance as a clearance in a side direction of the apparatus perpendicular to a sliding direction.

5. The apparatus of claim 1, wherein the first rail part is an over-molding over a first part of the apparatus.

6. The apparatus of claim 1, wherein the first rail part is of moldable material.

7. The apparatus of claim 1, wherein the second rail part is a separate rail attached to a second part of the apparatus.

8. The apparatus of claim 1, wherein the second rail part is of material harder than material of the first rail part.

9. The apparatus of claim 1, wherein the apparatus has a burr in a mouth of the first rail, the burr being configured to wear off when an edge of the second rail is moved against the burr.

10. The apparatus of claim 1, wherein the apparatus is a mobile device.

11. A method comprising:
    providing an apparatus with a first rail part and a second rail part which are allowed to slide with respect to each other;
    applying a wearable protrusion in one of the rail parts to set a pre-defined clearance between the rail parts, and
    pressing the second rail part against the protrusion arranged into the first rail part when attaching the second rail part to a second part of the apparatus.

12. The method of claim 11, comprising:
    using intentionally created burrs of controlled height to set the clearance between the rail parts.

13. The method of claim 11, wherein a first part of the apparatus is used as a mould over which moldable material is over-molded to form the first rail part.

14. The method of claim 11, wherein the protrusion is created into the first rail part as a burr by over-molding.

15. The method of claim 11, comprising:
    attaching the second rail part to the second part by laser welding.

* * * * *